H. G. WATKINS.
SAW FILER AND SETTER.
APPLICATION FILED DEC. 4, 1906.
952,656.
Patented Mar. 22, 1910.
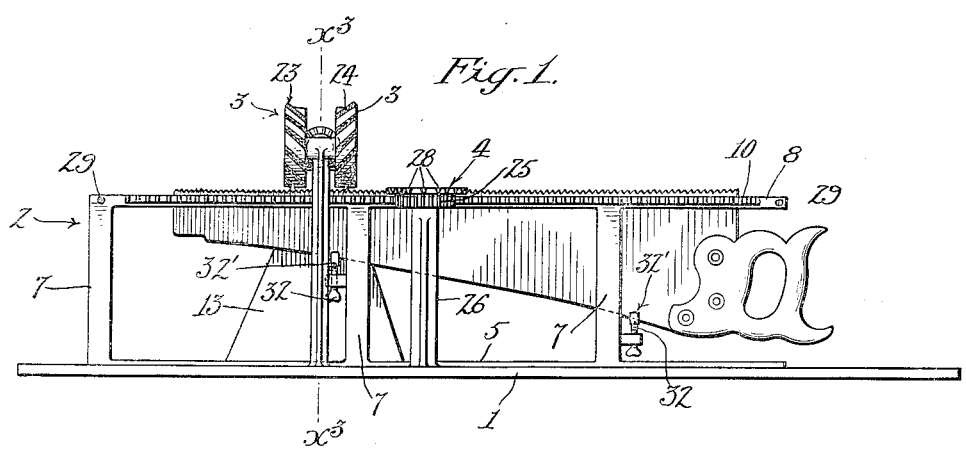
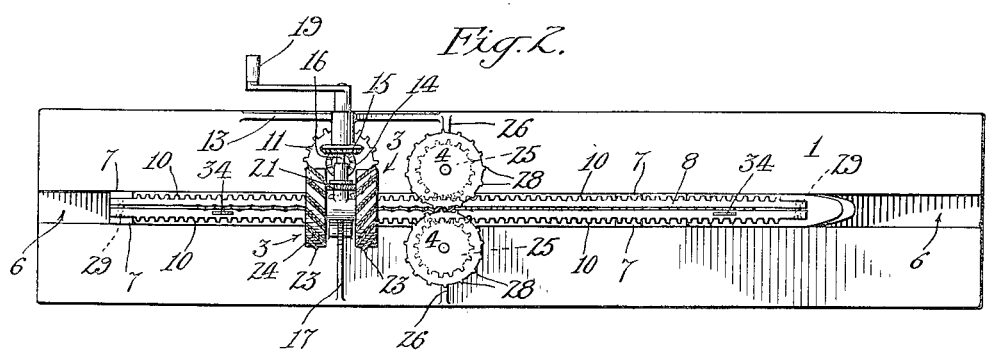
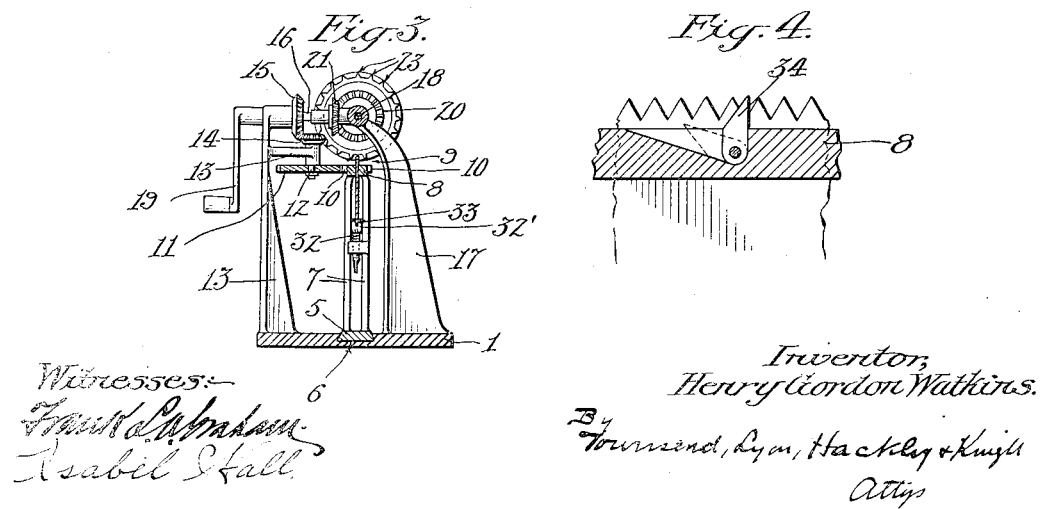
Inventor,
Henry Gordon Watkins.

UNITED STATES PATENT OFFICE.

HENRY GORDON WATKINS, OF WHITTIER, CALIFORNIA.

SAW FILER AND SETTER.

952,656.

Specification of Letters Patent. Patented Mar. 22, 1910.

Application filed December 4, 1906. Serial No. 346,339.

*To all whom it may concern:*

Be it known that I, HENRY GORDON WATKINS, a citizen of the United States, residing at Whittier, in the county of Los Angeles, State of California, have invented a new and useful Saw Filer and Setter, of which the following is a specification.

The main object of the present invention is to provide a device wherein the operations of filing and setting a saw can be performed in the same machine and by substantially the same operation.

Another object of the invention is to minimize the time required for filing and setting the saw.

Another object of the invention is to provide for filing and setting the saw in the most accurate manner.

The device is adapted to file and set different sizes of cross cut saws.

The accompanying drawings illustrate the invention.

Figure 1 is a side elevation of the device. Fig. 2 is a plan. Fig. 3 is a vertical section on line $x^3$—$x^3$ in Fig. 1. Fig. 4 is a detail section of a gage device for the saw.

The device comprises a base or support 1, a saw carrier 2 mounted to slide on said base or support, saw filing devices 3 and saw setting devices 4. The saw carrier 2 consists of a frame, the bottom member 5 of which is formed as a slide to travel longitudinally in a way 6 in the base 1. The frame 2 comprises standards 7 rising from said bottom member in pairs, and longitudinal bars or top members 8 extending along the top of the frame and supported on said standards, there being left between these top members and between the pairs of standards 7 a space for the reception of the saw, the top members being sufficiently close together to embrace the saw, indicated at 9 in Fig. 3.

Each top member 8 is formed or provided along its outer edge with a rack 10 to engage a gear wheel or pinion 11 carried by a vertical arbor 12 mounted on a bracket or standard 13, said arbor carrying a bevel gear 14 engaging with a bevel gear 15 carried by a horizontal arbor 16 also mounted in said bracket or standard and in a bracket 17 extending up on the other side of the device. The arbor 16 has an operating handle 19 and drives the filing devices 3, said devices consisting of disks or wheels independently mounted on a fixed arbor 18 on the bracket or standard 17, the said disks or wheels 3 being provided with, or having secured thereto, bevel gears or other means 20 engaged by a bevel gear or other means 21 on the driving arbor 16 to operate the said filing devices.

The axis or arbor of the filing disks or wheels extends parallel to the plane of motion of the saw-carrier so that the planes of rotation of the said filing members are parallel to one another and perpendicular to the plane of motion of the saw-carrier.

Each of the filing devices preferably consists of a disk or wheel formed on its periphery with obliquely, spirally or helically arranged flanges, projections or threads 23 whose surfaces are indented or formed with filing teeth as at 24 so that as the said disks are rotated in opposite directions by the operating devices above described, these filing teeth will travel in an oblique transverse direction with relation to the plane of the saw held in the carrier, and this motion, combined with the longitudinal motion of the saw will enable the filing ribs to continually fit in and travel with the teeth of the saw as it moves forward or backward.

A plurality of the filing ribs or projections 23 are provided on each disk, arranged at equal circumferential distances, and separated by blank spaces corresponding to the width of one saw tooth, so that in the rotation of the disk the filing ribs will come successively into operation, but each rib will enter between teeth which are separated from the last tooth operated on by one saw tooth space, the successively acting ribs of each disk thus skipping one saw tooth space in passing from one rib to the next. These alternate tooth spaces which are not entered by the ribs of one disk are entered by the ribs of the other disk. This is shown in Fig. 1, the spaces between the ribs being equal to the space between two saw teeth. The spaces thus skipped by one disk being entered by the ribs of the other disk, the alternate spaces are filed by the respective disks, thus giving the alternate direction of sharpening required in saw filing.

The racks 10 on the outside edges of the top members 8 of the carrier frame also engage gears or pinions 25 mounted in standards 26 and carrying setter disks or devices 4 which are formed with projections or teeth 28, the disks being so set that in their rotation these projections will come alternately into engagement with the teeth of the saw, setting or pressing said teeth alternately in opposite directions.

The top members 8 of the carrier frame 2 are provided with clamp screws 29 for clamping the saw the bars 8 being separately and elastically supported by standards 7, so as to permit this clamping action, and the frame 2 is provided with adjusting screws 32 constituting supports for the bottom of the saw, said screws having swivel thimbles 32′ with slots 33 in which the lower edge of the saw rests and the screws being adjusted by trial until the top of the saw is at the proper distance above the top member 8 of the carrier frame. To aid in such adjustment a gage device 34 may be pivoted to the carrier frame so that it may be turned up, to show the height to which the top of the saw teeth should extend in place of the saw and carrier, or it may be turned down out of the way when the saw is in place and ready for filing and setting.

The operation is as follows:—The saw is inserted within the frame and the screw supports 32 are adjusted to hold the saw at the proper level. The saw is then clamped in place either by the elasticity of the frame bringing its two parts together against the saw, or by clamping devices or screws 29. By turning the handle 19 the filing or abrading devices are operated, and through the gearing carrier 2 is pushed longitudinally on the base and bars 10 thereon are thereby caused to engage the operating gears 25 of the setting devices, to automatically operate said devices by the movement of the carrier. In this operation the filing disks 3 are driven in opposite directions so that the transverse strain on the saw is neutralized and each filing or cutting projection of each disk continually travels obliquely across the saw, in such manner that it follows up in its oblique movement, the forward movement of the saw teeth and notches, thereby continually filing away the teeth until they are brought to exact correspondence with the shape determined by the shape of these filing disks. Said disks will be made of hardened steel, carborundum, etc., or other suitable material and will be made removable from the arbor and of exact and accurate shape, so that by their operation as described the teeth of the saw are brought to uniform dimensions, spacing, and sharpness to a degree not possible with hand work. As the saw is moved inward the teeth are thus set in a continuous manner starting from the tip end of the saw and working toward the handle and the respective disks 4 rolling on opposite faces of the saw teeth and their projections 28 engage alternately with alternate teeth of the saw to set the same alternately in opposite directions, and after the teeth are thus set they are in the further movement of the saw brought into position for the operation of the filing devices.

What I claim is:—

1. In a saw filing machine, a base provided with oppositely located standards, one of said standards being provided with a bracket, a shaft journaled in said standards provided at one end with means for rotating it, two bevel wheels on said shaft, two rotary filing devices mounted on one of said standards and on opposite sides of said shaft and operatively connected with one of said gear wheels so as to be rotated in opposite directions thereby, a shaft journaled in said bracket, provided at its lower end with a feed wheel and at its upper end with a bevel wheel in engagement with the other one of said two bevel wheels, and a saw support mounted on the base to slide longitudinally thereof in operative engagement with said feed wheel.

2. In a saw filing and setting machine, a base, oppositely located standards thereon, saw filing mechanism mounted on one of said standards provided with a toothed feed wheel, and oppositely located setting mechanism on the other standards, said setting mechanism being provided with oppositely located toothed wheels at a distance apart, and a saw support mounted on the base to slide longitudinally thereof, the upper portion of which is provided with two racks, one of which is adapted to engage with the toothed feed wheel and with one of the wheels of the setting mechanism and the other one with the other wheel of the setting mechanism.

3. In a saw filing and setting machine, a base provided with a longitudinal recess to form ways, two pairs of standards on the base at a distance apart, rotary saw filing mechanism mounted on one pair of standards provided with a toothed feed wheel, setting mechanism mounted on the other standards provided with oppositely located toothed wheels at a distance apart, and a saw supporting frame comprising a base reciprocally located in said recess, pairs of standards rising therefrom and two oppositely arranged toothed racks at the upper ends of the last mentioned standards in position for passing between and engaging with the toothed wheels of the setting mechanism and one of said racks engaging with the toothed wheel of the filing mechanism.

In testimony whereof, I have hereunto set my hand at Los Angeles, California this 22nd day of November, 1906.

HENRY GORDON WATKINS.

In presence of—
 ARTHUR P. KNIGHT,
 FRANK L. A. GRAHAM.